US012592257B1

(12) United States Patent
Ravindranath et al.

(10) Patent No.: US 12,592,257 B1
(45) Date of Patent: Mar. 31, 2026

(54) MEDIA EDITING WITH CLIENT-SIDE EDITS AND SERVER-SIDE EDITS

(71) Applicant: Meta Platforms, Inc., Menlo Park, CA (US)

(72) Inventors: Satheesh Kumar Ravindranath, San Jose, CA (US); Ronald Anthony Kollammaparambil, Danville, CA (US); Bismark Takamori Ito, Santa Clara, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 48 days.

(21) Appl. No.: 18/143,539

(22) Filed: May 4, 2023

(51) Int. Cl.
*G11B 27/028* (2006.01)

(52) U.S. Cl.
CPC .................................. *G11B 27/028* (2013.01)

(58) Field of Classification Search
CPC .................................................. G11B 27/028
USPC .................................... 386/278, 282; 725/95
See application file for complete search history.

(56) References Cited

U.S. PATENT DOCUMENTS

| | | | | | |
|---|---|---|---|---|---|
| 8,972,862 | B2 * | 3/2015 | Haot | ..................... | G11B 27/031 |
| | | | | | 386/278 |
| 9,288,248 | B2 * | 3/2016 | Guerrera | ............... | H04L 65/762 |
| 2003/0052909 | A1 * | 3/2003 | Mo | ....................... | G11B 27/034 |
| 2008/0131072 | A1 * | 6/2008 | Chang | .................. | G11B 27/034 |
| | | | | | 386/280 |

| | | | | | |
|---|---|---|---|---|---|
| 2008/0247726 | A1 * | 10/2008 | Lee | ...................... | G11B 27/038 |
| | | | | | 386/282 |
| 2009/0097815 | A1 * | 4/2009 | Lahr | ...................... | G11B 27/02 |
| | | | | | 386/278 |
| 2010/0260468 | A1 * | 10/2010 | Khatib | ............... | H04N 21/2662 |
| | | | | | 386/282 |
| 2012/0251083 | A1 * | 10/2012 | Svendsen | ............. | G11B 27/031 |
| | | | | | 386/E5.028 |
| 2013/0195429 | A1 * | 8/2013 | Fay | ......................... | H04L 41/22 |
| | | | | | 715/744 |
| 2015/0050009 | A1 * | 2/2015 | Svendsen | ............. | G11B 27/036 |
| | | | | | 386/280 |
| 2015/0078732 | A1 * | 3/2015 | Shakib | ................... | G11B 27/02 |
| | | | | | 386/278 |

(Continued)

FOREIGN PATENT DOCUMENTS

| | | | | | |
|---|---|---|---|---|---|
| CN | 111935505 | A | * 11/2020 | .......... | H04N 21/234 |
| CN | 113542890 | A | * 10/2021 | ......... | H04N 21/8547 |

*Primary Examiner* — Thai Q Tran
*Assistant Examiner* — Stephen R Smith
(74) *Attorney, Agent, or Firm* — EVERSHEDS SUTHERLAND (US) LLP

(57) ABSTRACT

In the present application, a system for composing, editing, and sharing multimedia content is disclosed. A specification of an edit to a portion of a video is received on a client. A preview of the video with the edit applied to the portion of the video is provided on the client prior to encoding the video. Input data is provided to a machine learning model, wherein the machine learning model is used to make a determination of applying the edit to the portion of the video on the client or a server of a cloud service. In response to the determination of applying the edit to the portion of the video on the server of the cloud service, at least the specification of the edit to the portion of the video and the portion of the video without the edit applied are provided to the server of the cloud service.

16 Claims, 6 Drawing Sheets

(56) References Cited

U.S. PATENT DOCUMENTS

| | | | | |
|---|---|---|---|---|
| 2015/0150062 | A1* | 5/2015 | Guerrera | H04N 21/4331 |
| | | | | 725/95 |
| 2017/0345459 | A1* | 11/2017 | Manville | H04N 21/2402 |
| 2022/0038642 | A1* | 2/2022 | Chang | G11B 27/036 |
| 2022/0328071 | A1* | 10/2022 | Du | H04N 21/23424 |
| 2023/0057566 | A1* | 2/2023 | Huang | G11B 27/031 |
| 2023/0368074 | A1* | 11/2023 | Mallya Kasaragod | |
| | | | | G06N 20/00 |
| 2024/0106886 | A1* | 3/2024 | Roy | H04L 67/1029 |

* cited by examiner

300

(Audio Tracks are ignored for simplicity)

500

600

Start

Demultiplex and decode the components of the video — 602

Apply the edit of the video to individual frames of the video — 604

Display the edited individual frames of the video on the screen — 606

End

MEDIA EDITING WITH CLIENT-SIDE EDITS AND SERVER-SIDE EDITS

BACKGROUND OF THE DISCLOSURE

Multimedia composition and editing include the creation and manipulation of digital audio-visual files, such as image files, audio files and video files. It may also include animation and graphics. Multimedia is used in movies, television, websites, social media platforms, mobile phone applications, and the like. Different social media platforms or websites allow users to create, edit, post, and share multimedia content with others. Increasingly, people are creating their own digital content using their laptops, tablets, mobile phones, or other mobile devices. Therefore, improved techniques and systems for multimedia creating, editing, publishing, and sharing would be desirable.

BRIEF DESCRIPTION OF THE DRAWINGS

Various embodiments of the disclosure are disclosed in the following detailed description and the accompanying drawings.

DETAILED DESCRIPTION

Figure 1:
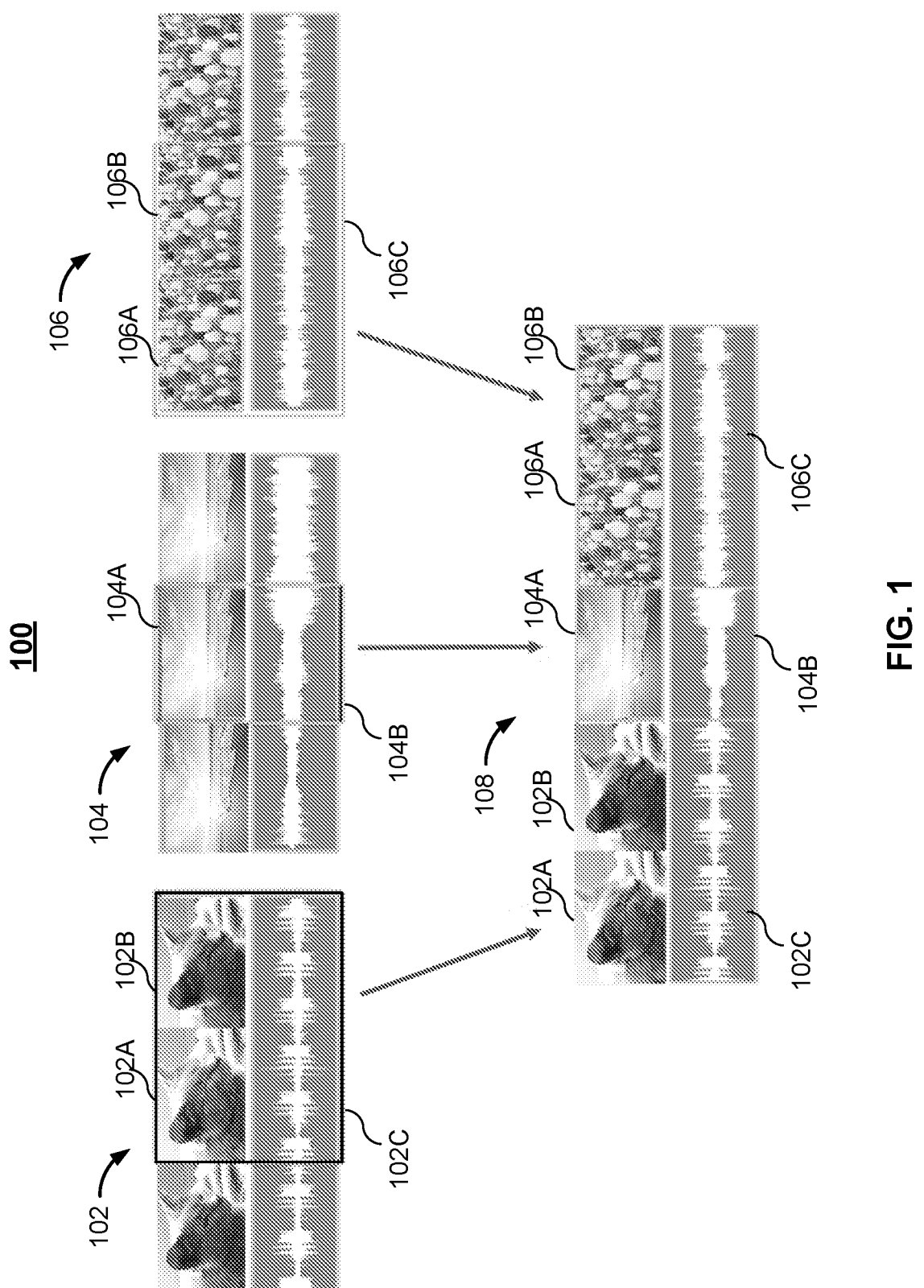
FIG. 1 illustrates an example 100 of composing and editing a multimedia track with multimedia contents from multiple sources.

The disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

A multimedia framework is a software framework that handles media on a computer and through a network. A good multimedia framework offers an intuitive application programming interface (API) and a modular architecture to easily add support for new audio, video, and container formats, and transmission protocols. It may be used by applications such as media players and audio or video editors, but may also be used to build videoconferencing applications, media converters, and other multimedia tools.

Different social media platforms or websites allow users to create, edit, post, and share rich media content (e.g., audio, video, animation, and text). For example, users may integrate and edit videos, photos, images, audio clips, text, stickers, captions, or other objects together, and then publish the rich media content for sharing with others by using their laptops, tablets, mobile phones, or other mobile devices.

One of the challenges is to provide an infrastructure that enables users to create rich media content across all platforms. For example, some operating systems (e.g., Android) do not have a comprehensive library for creating and real-time previewing rich media content with advanced features, including stitching, time-ranged audio/video effects, overlapping tracks, and the like.

Another challenge is that existing techniques do not allow users to preview their rich media content while it is being created or edited. For example, a user may need to first convert the photo to a video, combine it with other video clips, and then add text or other objects to the combined video. And if the user wishes to further change the position of a text object or make other changes to the video, the user may not preview the effect immediately. Instead, the user can view the final output only after the processing and the generation of the final video file is done.

Another problem is that the user's device may have limited resources, connectivity, and capabilities for handling the editing, uploading, publishing, and sharing of the rich media content. As a result, the user may need to wait for a long time before the tasks are performed, and the operations may also fail after a time-out.

The present application discloses a media composition framework or system (also referred to as MediaComposition) that allows users to select multiple input media files (images/videos/audio) and choose specific segments for temporal (time-based) or spatial (layout-based) arrangement and transformation.

MediaComposition framework enables users to create rich and interesting media compilations on different operating systems (e.g., Android), including playing the media content back in real-time for previewing purposes (also referred to as zero-latency previewing) without local transcoding, which results in costly computation/power consumption and quality loss due to compression. Augmented reality (AR) is an interactive experience that combines real world and computer-generated content. The content can span multiple sensory modalities, including visual, auditory, haptic, somatosensory, and olfactory. For example, AR filters are computer-generated effects designed to be superimposed on real-life images. AR filters may be used to add a layer or imagery in the foreground or background of an image. MediaComposition framework is integrated with internal libraries to enable video AR effects and audio AR effects. MediaComposition framework can also apply server-side effects that may not be available on the client side and play back the output in near-real-time on the client. Server-side editing has the advantage of offloading some of the processing and editing of the rich media content from the client side to the server side, which may have more resources, computation power, and capabilities. As a result, the processing and editing of the media content may be more efficient with a higher success rate and a shorter wait time. MediaComposition framework intelligently determines whether certain editing and processing tasks should be performed by the client side or the server side based on different factors. For example, MediaComposition framework may determine whether certain tasks should be performed by the client side or the server side using a trained machine learning model.

In the present application, a method for composing, editing, and sharing multimedia content is disclosed. A specification of an edit to a portion of a video is received on a client. A preview of the video with the edit applied to the portion of the video is provided on the client prior to encoding the video. Input data is provided to a machine learning model, wherein the machine learning model is used to make a determination of applying the edit to the portion of the video on the client or a server of a cloud service. In response to the determination of applying the edit to the portion of the video on the server of the cloud service, at least the specification of the edit to the portion of the video and the portion of the video without the edit applied are provided to the server of the cloud service.

A system for composing, editing, and sharing multimedia content is disclosed. The system includes a processor configured to receive on a client a specification of an edit to a portion of a video. The processor is configured to provide on the client a preview of the video with the edit applied to the portion of the video prior to encoding the video. The processor is configured to provide input data to a machine learning model, wherein the machine learning model is used to make a determination of applying the edit to the portion of the video on the client or a server of a cloud service. The processor is configured to, in response to the determination of applying the edit to the portion of the video on the server of the cloud service, provide to the server of the cloud service at least the specification of the edit to the portion of the video and the portion of the video without the edit applied. The system further comprises a memory coupled to the processor and configured to provide the processor with instructions.

A computer program product for composing, editing, and sharing multimedia content is disclosed. The computer program product is embodied in a non-transitory computer readable medium and comprising computer instructions for receiving on a client a specification of an edit to a portion of a video. The computer program product further comprises computer instructions for providing on the client a preview of the video with the edit applied to the portion of the video prior to encoding the video. The computer program product further comprises computer instructions for providing input data to a machine learning model, wherein the machine learning model is used to make a determination of applying the edit to the portion of the video on the client or a server of a cloud service. The computer program product further comprises computer instructions for, in response to the determination of applying the edit to the portion of the video on the server of the cloud service, providing to the server of the cloud service at least the specification of the edit to the portion of the video and the portion of the video without the edit applied.

FIG. 1 illustrates an example 100 of composing and editing a multimedia track with multimedia contents from multiple sources. Media from different sources may be stitched together in any order to create one composite media stream. A plurality of video frames extracted from three different media tracks (102, 104, and 106) and their corresponding audio segments may be stitched into a single media track 108. As shown in FIG. 1, video frames 102A and 102B are extracted from media track 102 to form the beginning segment of media track 108. The audio segment 102C associated with video frames 102A and 102B is extracted from media track 102 to form the audio portion of the beginning segment of media track 108 as well. Similarly, video frame 104A is extracted from media track 104 to form the middle segment of media track 108. The audio segment 104B associated with video frame 104A is extracted from media track 104 to form the audio portion of the middle segment of media track 108. Video frames 106A and 106B are extracted from media track 106 to form the last segment of media track 108. The audio segment 106C associated with video frames 106A and 106B are extracted from media track 106 to form the audio portion of the last segment of media track 108. In addition to integrating different portions from multiple media tracks into one media track, the user may also edit media track 108 by adding images, photos, or other objects and moving the positions of the objects. Objects may include text, stickers, captions, and the like.

Figure 2:
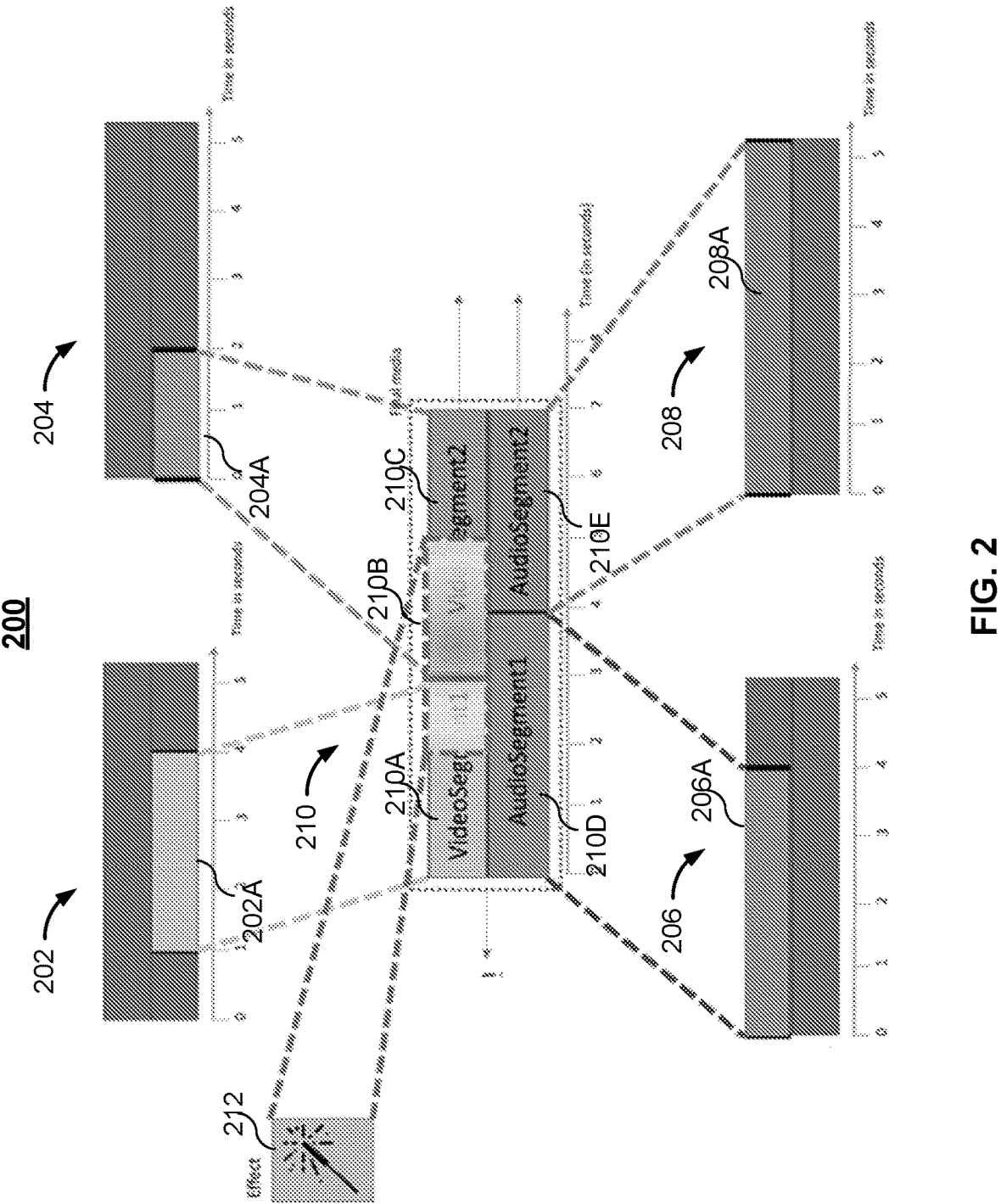
FIG. 2 illustrates an example 200 of composing and editing a multimedia track with multimedia contents from multiple sources.

FIG. 2 illustrates an example 200 of composing and editing a multimedia track with multimedia contents from multiple sources. Media from different sources may be stitched together to create one media track. In this example, the video segments and the audio segments for generating the new media track are extracted from different sources. Two media tracks provide the video segments and two other different media tracks provide the audio segments of the new media track. A plurality of video segments extracted from two different media tracks (202 and 204) may be stitched together to form the video portion of a single media track 210. A plurality of audio segments extracted from two different media tracks (206 and 208) may be stitched together to form the audio portion of media track 210.

As shown in FIG. 2, a video segment 202A is extracted from media track 202 to form the beginning video segment 210A of media track 210. Similarly, a video segment 204A is extracted from media track 204 to form the last video segment 210C of media track 210. An audio segment 206A is extracted from media track 206 to form the beginning audio segment 210D of media track 210. Similarly, an audio segment 208A is extracted from media track 208 to form the last audio segment 210E of media track 210.

In addition to integrating different portions from multiple media tracks into one media track as shown above, the user may also edit media track 210 by adding images, photos, text, stickers, captions, or other objects to the media track. The user may also mix audio segment 210D and audio segment 210E at different volume levels. The user may also add audio AR effects to media track 210. The user may also edit media track 210 by applying effects to a portion of media track 210. An effect 212 is applied to the video segment 210B of media track 210 that spans across video segment 210A and video segment 210C with a specified time range. For example, effect 212 may be an AR effect, such as a face mask or a sticker. An effect may be a visible effect or an invisible effect. Examples of visible effects include effects that create changes in speed, distortions, or reflections. Some visible effects are achieved by applying artistic filters, stylistic color grading, animated transitions, and adding three-dimensional (3D) elements of computer-generated imagery (CGI) to the media track. Examples of invisible effects include color-correcting, stabilizing of shaky footage, or adding subtle artistic effects to increase realism in the footage.

As shown in FIG. 2, the speed of some of the video segments and the audio segments that are stitched together may be changed by any speed factor, e.g., faster or slower. For example, the original video segment 204A from media track 204 is two seconds in duration, and the corresponding video segment 210C in the final media track 210 is four seconds in duration. Therefore, the speed of the video segment 210C is reduced by half.

Figure 3:
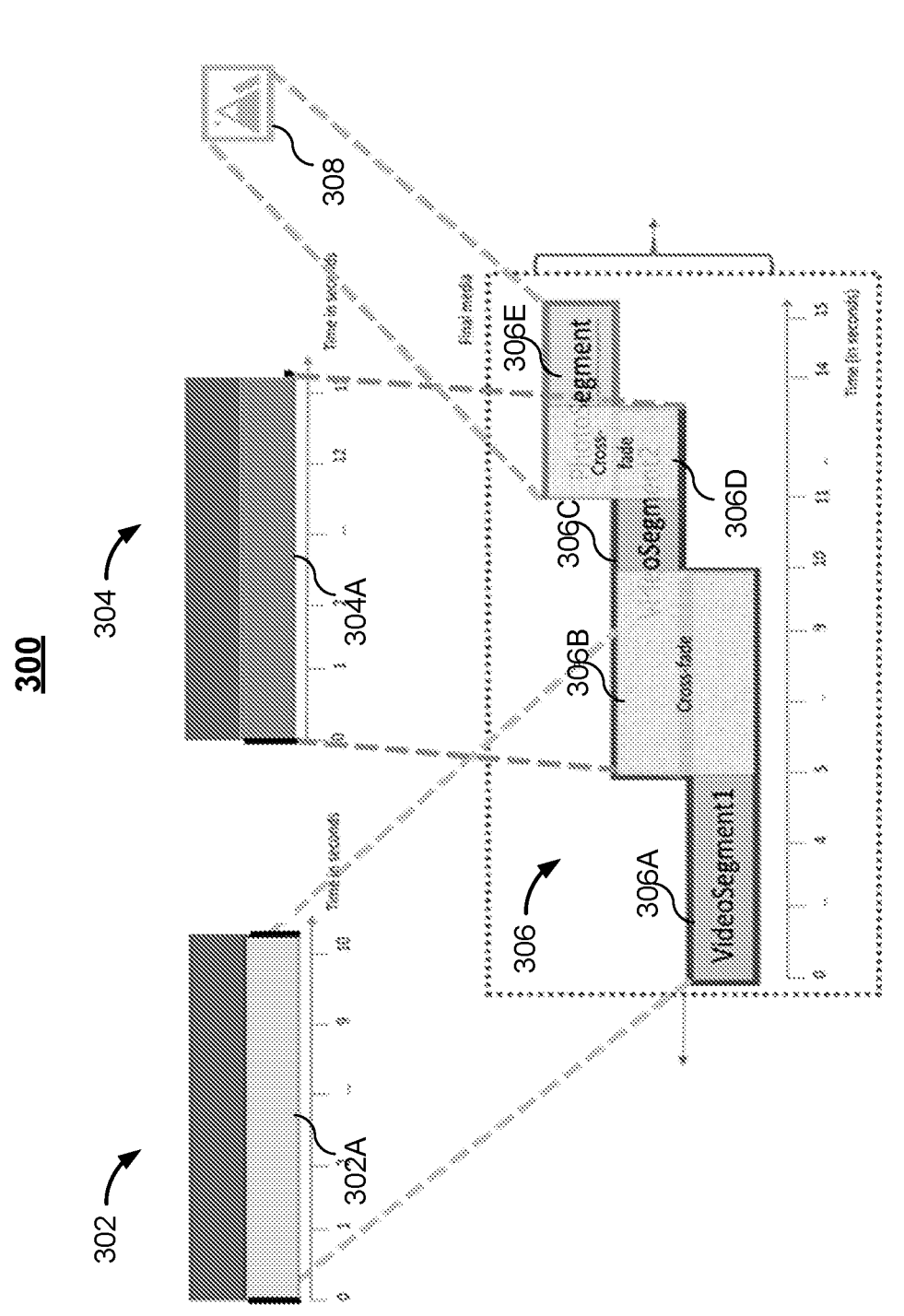
FIG. 3 illustrates an example 300 of composing and editing a multimedia track with multimedia contents from multiple sources

FIG. 3 illustrates an example 300 of composing and editing a multimedia track with multimedia contents from multiple sources. Media from different sources may be stitched together to create one media track. In this example, only the stitching, processing, and editing of the video segments for generating the new media track are illustrated. The processing and editing of the audio segments are omitted in this example for simplicity. In this example, a plurality of video segments extracted from two different media tracks (302 and 304) and a photo image 308 may be stitched together to form the video portion of a single media track 306.

As shown in FIG. 3, a video segment 302A is extracted from media track 302 to form the beginning video segment 306A of media track 306. Similarly, a video segment 304A is extracted from media track 304 to form the video segment 306C of media track 306. A photo image 308 is converted to a video and the converted photo segment 306E that is four seconds in duration is stitched to the end of media track 306.

In addition to integrating different portions from multiple media tracks into one media track as shown above, the user may also edit media track 306 by adding photos, text, stickers, captions, or other objects to the media track. In this example, video segment 306A and video segment 306C overlap each other, with video segment 306C starting at a later timestamp. A crossfade effect is applied to the over-lapped segment 306B. A crossfade (also known as a dis-solve) is when one of two overlapping segments fades in as the other overlapping segment fades out. A crossfade makes a video segment gradually appear as another disappears. In other words, it is a transition that seamlessly blends one segment into the next rather than one ending where the other begins. The speed of some of the video segments that are stitched together have been changed. For example, video segment 302A from media track 302 is five seconds in duration, and the corresponding video segment 306A is six seconds in duration, and therefore the speed has been reduced. Photo image 308 is a single image, and it is converted to a video segment that is four seconds in dura-tion. Video segment 306C and photo segment 306E overlap each other. A crossfade effect is applied to the overlapped segment 306D.

In some other examples, a video segment from a media track may be reversed and then stitched with another video segment from another media track to create one media track. A video segment from a media track may also be reversed without being stitched to other video segments to form the final media track.

Figure 4:
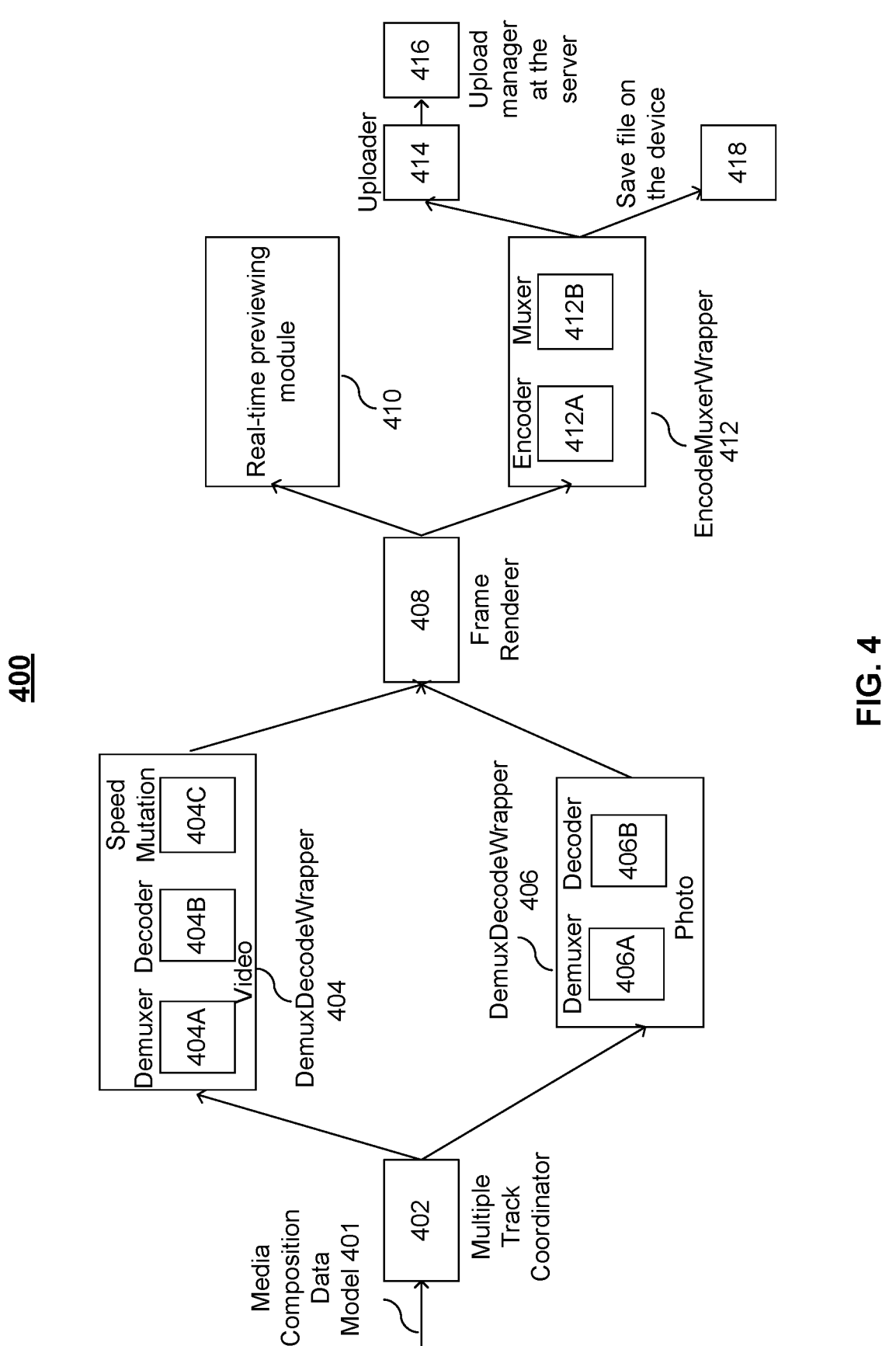
FIG. 4 illustrates an exemplary architecture diagram of the media composition system 400.

FIG. 4 illustrates an exemplary architecture diagram of the media composition system 400. For example, media composition system 400 may be a software development kit (SDK) for an operating system, such as Android. Besides creating and editing the media track, the user may do additional tasks, including generating and saving a video file, rendering the output directly for viewing without gen-erating the video file (also referred to as zero-latency pre-viewing or on-the-fly previewing), and generating and uploading the video file to a cloud server or platform.

Figure 5:
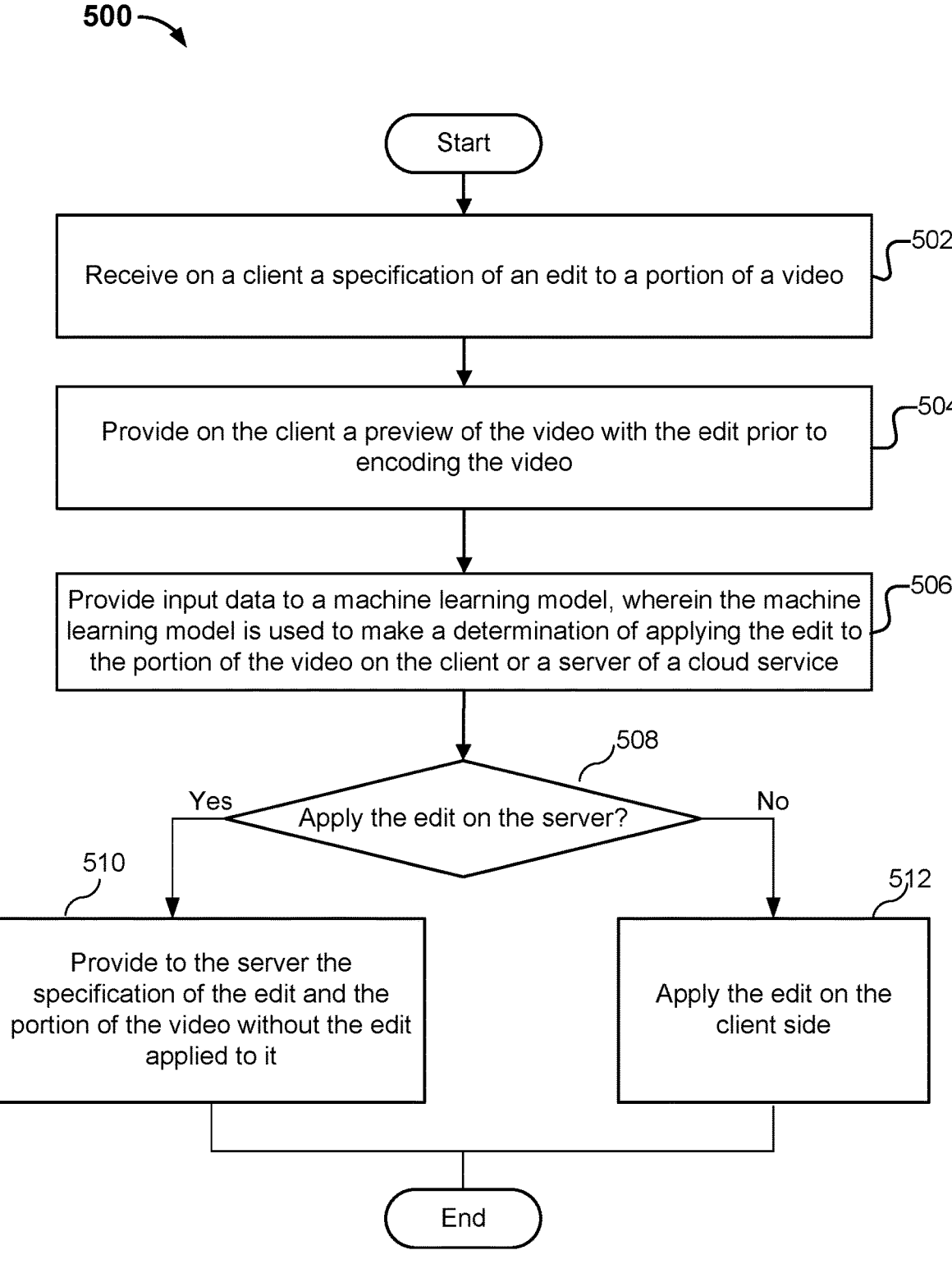
FIG. 5 illustrates an exemplary process 500 for composing, editing, and viewing multimedia content.

FIG. 5 illustrates an exemplary process 500 for compos-ing, editing, and viewing multimedia content. In some embodiments, process 500 is performed by at least some of the modules in media composition system 400 in FIG. 4.

With continued reference to FIG. 4, the input to media composition system 400 is a media composition data model 401. Media composition data model 401 may include mul-tiple tracks or segments from multiple video or audio sources, including their source video files, and their associ-ated metadata and attributes. Each segment or track in media composition data model 401 is associated with a demulti-plexing and decoding wrapper (DemuxDecodeWrappers 404 and 406) to demultiplex and decode the clips. A video decoder decompresses digital video. A demultiplexer (de-muxer) creates two or more streams of data from a single-stream input. A multiple track coordinator 402 (MultiTrack-Coordinator) coordinates between different DemuxDecodeWrappers (404 and 406) to coordinate and orchestrate the entire media timeline.

DemuxDecodeWrapper 406 handles the demultiplexing and decoding of the photo inputs. DemuxDecodeWrapper 406 includes a demuxer 406A and a decoder 406B. Demux-DecodeWrapper 406 decodes the image once into a bitmap and updates the surface texture once with the bitmap image. For example, when the decodeFrameAndAdvance( ) API is called, the image is treated as a frame and is decoded into a bitmap. DemuxDecodeWrapper 406 also updates the pre-sentation time stamp of the photo. When a request for decoded time stamps is received by DemuxDecodeWrapper 406, it returns presentation timestamps corresponding to the frames per second (FPS) set by the wrapper. For example, if the FPS is 30 fps, DemuxDecodeWrapper 406 may set the timestamps for the frames at 33 milliseconds (ms), 66 ms, and 99 ms, and these values may be returned when certain APIs (e.g., decodeFrameAndAdvance( ) and getDecoded-Timestamp( )) are called.

DemuxDecodeWrapper 404 handles the demultiplexing and decoding of the video inputs. DemuxDecodeWrapper 404 includes a demuxer 404A, a decoder 404B, and a speed mutation module 404C. When the decodeFrameAndAd-vance( ) API is called, a new frame is decoded and the next frame is advanced to the frame following the decoded frame.

Multiple track coordinator 402 may run a custom clock that has its own fps used for normalizing the fps among all overlapping videos/photos. Multiple track coordinator 402 may call decodeFrameAndAdvance( ) and getDecoded-Timestamp( ) on DemuxDecodeWrapper for the coordina-tion of the media timeline.

When multiple track coordinator 402 needs to display a frame on the screen or to send the frame to a file for upload/save, it may call displayFrame( ) that pushes the decoded frame to the output. The decoded images from DemuxDecodeWrapper 406 and the decoded frames from DemuxDecodeWrapper 404 are sent to a frame renderer 408 for rendering the combined media track.

Zero-latency previewing or on-the-fly previewing enables a user to edit the media track and view any intermediate results immediately. Real-time previewing module 410 receives output frames from frame renderer 408 and renders the output directly to a display screen for viewing without generating the video file.

For example, a user may compose and edit a video on a mobile device using multiple resources, including videos, photos, images, audio clips, text, stickers, captions, or other objects. While the user is combining multiple video segments to form a single media track, the user may add a caption on a portion of the media track (e.g., a video segment) at a specified time, and the user may preview the result with the on-the-fly previewing feature. Referring back to FIG. 5, at 502, a specification of an edit to a portion of a video (i.e., the media track) is received on a client. In this example, the specification of the edit to the video includes the media track composed with the different resources, the video segments, the timestamp of where the caption is inserted, the position of the caption on the screen, the content of the caption, such as the font type, the color, the text, and the like.

However, it should be recognized that the specification of the edit to the video received on the client may include any specification that corresponds to the different resources that are included in the media track. For example, when a new video clip is added, the specification of the edit may include the media track to which the new video clip is added, the attributes or other information of the video clip, the beginning and ending timestamps of the video clip, the duration of the video clip, and the like. For example, with reference to FIG. 2, a video segment 204A is extracted from media track 204 to form the last video segment 210C of media track 210, and the specification of the edit may include the attributes of video segment 204A, including the timestamps of the beginning and the end of the segment. The specification of the edit may include the timestamps of the beginning and the end of the video segment 210C of media track 210. The specification of the edit may further include the speed of the video segment 210C of media track 210.

In another example, with reference to FIG. 2, an effect 212 is applied to the video segment 210B of media track 210 that spans across video segment 210A and video segment 210C with a specified time range. For example, effect 212 may be an AR effect, such as a face mask or a sticker. The specification of the edit may include the media track 210 to which the effect 212 is applied, the attributes of effect 212, the timestamps of the beginning and the end of the video segment 210B of media track 210, the duration of video segment 210B, and the like.

In another example, with reference to FIG. 3, a photo image 308 is converted to a video and the converted photo segment 306E that is four seconds in duration is stitched to the end of media track 306. The specification of the edit may include media track 306 to which the photo is added, the attributes of photo image 308, the timestamps of the beginning and the end of the photo segment 306E of media track 306, the duration of the photo segment 306E, and the like.

Figure 6:
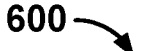
FIG. 6 illustrates an exemplary process 600 for immediate previewing of composed and edited multimedia content.
Figure 6:
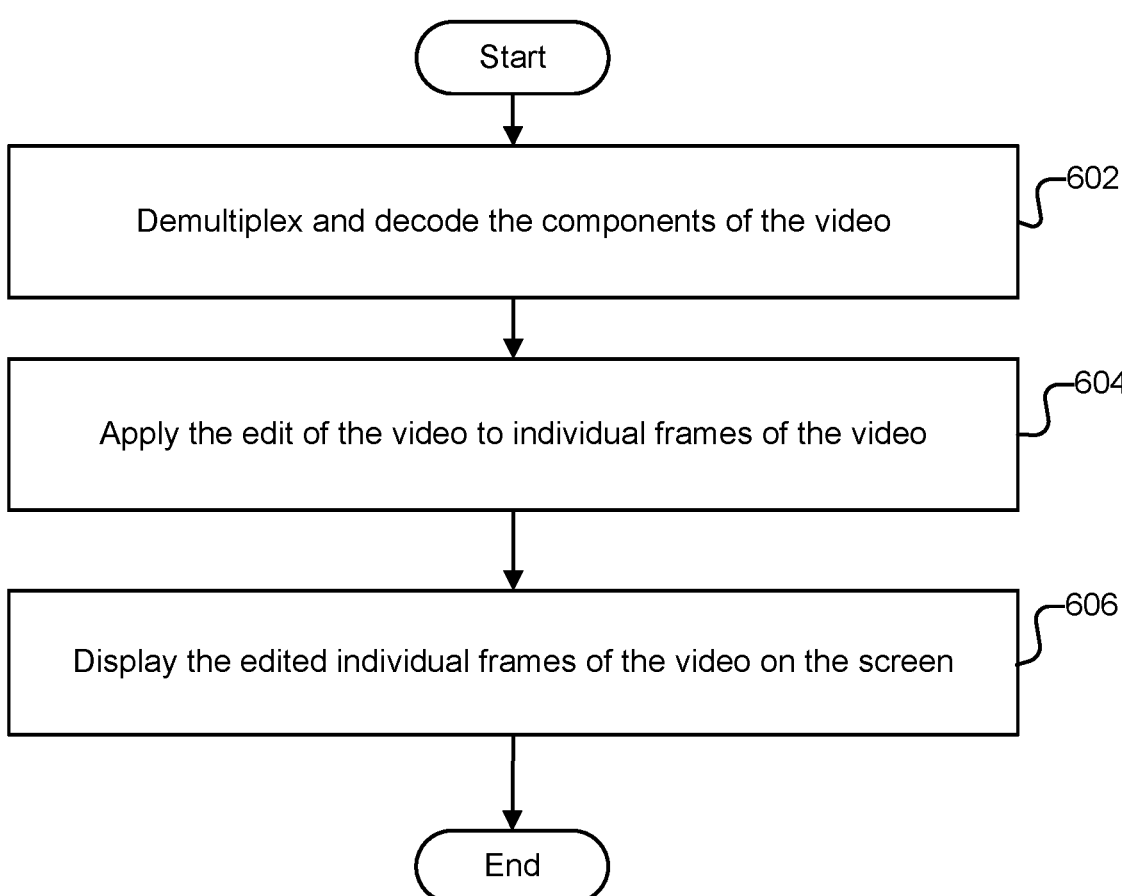

With reference to FIG. 5, at 504, a preview of the video with the edit applied to the portion of the video is provided on the client prior to encoding or transcoding the video. Encoding includes compression to create a smaller file. Transcoding includes transferring an already compressed source to a different format. FIG. 6 illustrates an exemplary process 600 for immediate previewing of composed and edited multimedia content. In some embodiments, process 600 is performed by at least some of the modules in media composition system 400 in FIG. 4 at step 504 of process 500 in FIG. 5.

The advantages of zero-latency previewing or on-the-fly previewing include enabling a user to edit the media track and view any intermediate results immediately. There is no need to contact or coordinate with the cloud server because the zero-latency previewing may be performed only on the client side. There is no need to compress and/or encode the media track, and save it into a video file, such as an MPEG-4 Part 14 (MP4) video file, before the previewing. MP4 is a digital multimedia container format most commonly used to store video and audio, but it can also be used to store other data such as subtitles and still images. MP4, like most modern container formats, allows streaming over the Internet.

At step 602, components of the video (e.g., photo and video clips) are demultiplexed and decoded. For example, suppose that the media track includes multiple video clips and a photo, and an effect is applied to the media track for previewing, then the video components of the media track are demultiplexed and decoded by DemuxDecodeWraper 404 that includes demuxer 404A, decoder 404B, and speed mutation module 404C. The photo component of the media track is demultiplexed and decoded by DemuxDecodeWraper 406 that includes demuxer 406A and decoder 406B. The demultiplexed and decoded components are then sent to frame renderer 408.

At step 604, the edit of the video is applied to individual frames of the video. At step 606, the edited individual frames of the video are displayed on the screen. As shown in FIG. 4, frame renderer 408 receives the demultiplexed and decoded components of the media track. It also receives other information, including the specification of the edit, including any metadata or attributes of the media track, the attributes of the effect, the timestamps of the beginning and the end of the segment of the media track to which the effect is applied, the duration of the segment, and the like. The edit is then applied to individual frames of the video. For example, with reference to FIG. 2, effect 212 is applied to the video segment 210B of media track 210 that spans across video segment 210A and video segment 210C with a specified time range. Effect 212 is applied to each individual frame of video segment 210B. And as soon as effect 212 is applied to one individual frame, the edited individual frame is rendered by frame renderer 408 and displayed on the screen by real-time previewing module 410. Effect 212 is again applied to the next individual frame of video segment 210B. The next edited individual frame is rendered and displayed, and so on. The displayed individual frames may be displayed at a specified resolution. And after each edited individual frame is displayed, the associated information may be deleted, thereby saving storage space.

Referring back to FIG. 4, the media track may also be generated and saved to a video file 418 on the user's device. An encoding and multiplexing wrapper 412 (EncodeMuxerWrapper 412) is used for encoding and multiplexing. A video encoder compresses digital video. A multiplexer (or muxer) writes all the video/audio bytes into a desired output container format. EncodeMuxerWrapper 412 includes an encoder 412A and a muxer 412B. After EncodeMuxerWrapper 412 receives the output frames from frame renderer 408, it handles the encoding and the multiplexing, and the output is saved to a video file 418 on the device.

The media track may be uploaded from the user's client device to a cloud server for sharing with other users. For example, a user may click a "share" button, and an upload flow may be triggered. For some cases, the editing of the media track is handled by the client side only. For some cases, the editing of the media track is divided between the client side and the server side. Server-side editing has the advantage of offloading some of the processing and editing of the rich media content from the client side to the server side, which may have more resources, computation power, and capabilities. As a result, the processing and editing of the media content may be more efficient with a higher success rate and a shorter wait time. Media composition system 400 includes an upload manager 416 on the cloud server side for uploading the media track from the user's client device to the cloud server.

With reference to FIG. 5, at step 506, input data is provided to a machine learning model, wherein the machine learning model is used to determine whether to apply the edit to the portion of the video on the client or a server of a cloud service. At step 508, it is determined whether the edit to the portion of the video is applied on the server side based on the machine learning model output. If the machine learning model determines that the edit is applied on the server side, then at step 510, at least the specification of the edit to the portion of the video and the portion of the video without the edit applied to it are provided to the server of the cloud service. If the machine learning model determines that the edit is applied on the client side, then at step 512, the edit is applied on the client side before the portion of the video is uploaded to the server side.

The final media track may be generated by the client side with client-side editing only and then uploaded to a cloud server or platform. All the edits to the media track are applied on the client side only, with no server-side editing. An uploader 414 is used for uploading the media track to upload manager 416 on the cloud server or platform. After uploader 414 receives the output from EncodeMuxerWrapper 412, it handles the uploading of the media by sending it to upload manager 416 at the cloud server or platform. The final media track is sent in a compressed format. For example, the final media track may be sent as a compressed MP4 video file. Upload manager 416 may determine (e.g., by using a trained machine learning model) that the editing of the media track should be handled by the client side only due to different factors, including network connectivity, the uncompressed media track file size, client user device resources, and the like. In some embodiments, the resolution of the final media track and the upload rate (in bits per second) may also be determined by upload manager 416 based on different factors, e.g., by using a trained machine learning model.

For some cases, the editing of the media track is divided between the client side and the server side. At least some of specifications of the edits to be applied to the video are sent to the server to enable the server to apply the server-side edits. Upload manager 416 may dynamically determine (e.g., by using a trained machine learning model) the portion of the editing tasks associated with the media track that is handled by the client side and the portion of the editing tasks associated with the media track that is handled by the server side based on different factors, including server loads, the number of available servers, time of the day of the upload, peak server hours, client processing power capacity, client device type, server processing power capacity, client capability, server capability, and the like. For example, certain types of edits may be features that are only available on the server. Certain types of edits may be features that are only available on the client side, such as certain AR effects or masks. Upload manager 416 may determine which segments are edited by the client side and which segments are edited by the server side.

Upload manager 416 may also determine which uncompressed source segments corresponding to a media track should be compressed (i.e., via encoding) before the uploading and which uncompressed source segments may be uploaded without further compression. Uncompressed segments have no loss in quality. Upload manager 416 may dynamically determine (e.g., by using a trained machine learning model) which uncompressed source segments corresponding to a media track should be compressed before the uploading and which uncompressed source segments should be uploaded without further compression based on different factors, including the file size, network connectivity, network connection type, network capacity, time of the day of the upload, peak network traffic hours, and the like. For example, upload manager 416 may determine that a particular segment may be uploaded as an uncompressed segment if it determines that the network capacity allows the segment to be uploaded efficiently and reliably due to the small file size and the network capacity being above a certain minimum threshold. In this case, the segment is uploaded to upload manager 416 by a simple file transfer of the source file, and there is no need to perform the demultiplexing and the decoding steps. Typically, if the media track is encoded/compressed before the uploading, then it is often beneficial to have the editing tasks performed on the client side. If a segment is uncompressed, then the editing tasks may be performed on the client side or the server side. In one example, upload manager 416 may determine that the video editing portion is performed on the client side and the audio editing portion is performed on the server side. In this example, the audio segments may be sent in an uncompressed format, and the editing of the audio segment may be performed on the server side.

The machine learning model may be trained to optimize the uploading flow by trading off different metrics, including quality, latency, success rate, computing cost, memory usage, and the like. For example, server-side editing may increase the latency of the overall upload but improve the quality (e.g., mean opinion score (MOS)) of the media track. Another metric may include the number of transcoding steps needed. As the number of transcoding steps increases, the quality of the media track deteriorates.

As shown above, the machine learning model may receive different input factors (or machine learning features) to determine how to partition the editing tasks between the client side and the server side. Additional input factors are provided below as illustrative examples. It should be recognized that the input factors that may be used are not limited to the ones provided below. One of the input factors is the network download bandwidth that is estimated from the client side. Another input factor is the file size of the source video file. Another input factor is the transcoding bitrate. Another input factor is the upload bandwidth estimate based on the user's IP address. Another input factor is the media track's duration. Another input factor is the user's country. Another input factor is the connection type of the client, such as wi-fi or cellular. Another input factor is the number of followers for the user. Another input factor is the device's RAM class. Another input factor is the device's AR class. Another input factor is the source file's resolution (e.g., the height of the video or the width of the video). Another input factor is the source video codec type. Another input factor is the source video bitrate. Another input factor is the geolocation of the user. Another input factor is the resolution of the targeted transcoder. Another input factor is the type of transcode video codec. Another input factor is whether the user is a premium user based on the user's number of followers. Another input factor is whether the source file or the transcoding is in high dynamic range (HDR).

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A method, comprising:

receiving on a client a specification of an edit to a portion of a video;

providing on the client a real-time preview of the video with the edit applied dynamically to the portion of the video prior to encoding the video, wherein dynamically applying the edit comprises:

applying the edit to a first individual video frame of the plurality of individual video frames corresponding to the portion of the video based on the received specification of the edit; and displaying the first individual video frame of the plurality of individual video frames before applying the edit to a second individual video frame of the plurality of individual video frames corresponding to the portion of the video based on the received specification of the edit;

providing input data to a machine learning model, wherein the machine learning model is used to make a determination of applying the edit to the portion of the video on the client or a server of a cloud service;

in response to the determination of applying the edit to the portion of the video on the server of the cloud service, providing to the server of the cloud service at least the specification of the edit to the portion of the video and the portion of the video without the edit applied;

generating, based at least in part on the determination, an edited video comprising the portion with the edit;

in response to the determination of applying the edit to the portion of the video on the client, applying the edit to the portion of the video on the client and providing to the server of the cloud service the portion of the video with the edit applied; and in response to providing to the server the portion of the video with the edit applied, causing the video to be deleted.

2. The method of claim 1, wherein the machine learning model is used to determine whether to compress the portion of the video with the edit applied on the client.

3. The method of claim 1, wherein the machine learning model is used to determine whether to compress the portion of the video without the edit applied on the client.

4. The method of claim 1, wherein providing on the client the preview of the video with the edit applied to the portion of the video prior to encoding the video further comprises:

demultiplexing the video to obtain the portion of the video; and decoding the portion of the video.

5. The method of claim 1, wherein providing on the client the preview of the video with the edit applied to the portion of the video prior to encoding the video further comprises:

applying the edit to a plurality of individual video frames corresponding to the portion of the video based on the received specification of the edit;

displaying the plurality of individual video frames on the client.

6. The method of claim 5, wherein providing on the client the preview of the video with the edit applied to the portion of the video prior to encoding the video further comprises:

deleting the plurality of individual video frames after the displaying of the plurality of the individual video frames on the client.

7. The method of claim 1, further comprising:

providing the input data to the machine learning model via the server of the cloud service; and receiving the determination of the machine learning model via the server of the cloud service.

8. The method of claim 1, wherein the machine learning model is trained based on a plurality of metrics comprising one or more of the following: quality, latency, success rate, computing cost, memory usage, or a number of transcoding steps.

9. The method of claim 1, wherein the portion of the video comprises one or more of the following: a video segment, an audio segment, or a video segment converted from a photo.

10. The method of claim 1, wherein the edit of the video comprises one or more of the following:

integrating a new video segment into the video, integrating a new audio segment into the video, integrating a photo into the video, adding an object to the video, or applying an effect to the portion of the video.

11. The method of claim 1, wherein the specification of the edit comprises one or more of the following: a timestamp associated with the edit, a duration of the edit, or an attribute of the edit.

12. A system, comprising:

memory;

one or more processors coupled to the memory and configured to:

receive on a client a specification of an edit to a portion of a video;

provide on the client a real-time preview of the video with the edit applied dynamically to the portion of the video prior to encoding the video, wherein dynamically applying the edit comprises:

applying the edit to a first individual video frame of the plurality of individual video frames corresponding to the portion of the video based on the received specification of the edit; and displaying the first individual video frame of the plurality of individual video frames before applying the edit to a second individual video frame of the plurality of individual video frames corresponding to the portion of the video based on the received specification of the edit;

provide input data to a machine learning model, wherein the machine learning model is used to make a determination of applying the edit to the portion of the video on the client or a server of a cloud service;

in response to the determination of applying the edit to the portion of the video on the server of the cloud service, provide to the server of the cloud service at least the specification of the edit to the portion of the video and the portion of the video without the edit applied;

generate, based at least in part on the determination, an edited video comprising the portion with the edit;

in response to the determination of applying the edit to the portion of the video on the server of the cloud service, applying the edit to the portion of the video on the client and providing to the server of the cloud service the portion of the video with the edit applied; and in response to providing to the server the portion of the video with the edit applied, cause the video to be deleted.

13. The system of claim 12, wherein providing on the client the preview of the video with the edit applied to the portion of the video prior to encoding the video further comprises:

demultiplexing the video to obtain the portion of the video; and decoding the portion of the video.

14. The system of claim 12, wherein providing on the client the preview of the video with the edit applied to the portion of the video prior to encoding the video further comprises:

applying the edit to a plurality of individual video frames corresponding to the portion of the video based on the received specification of the edit; and displaying the plurality of individual video frames on the client.

15. A computer program product embodied in a non-transitory computer readable medium and comprising computer instructions for:

receiving on a client a specification of an edit to a portion of a video;

providing on the client a real-time preview of the video with the edit applied dynamically to the portion of the video prior to encoding the video, wherein dynamically applying the edit comprises:

applying the edit to a first individual video frame of the plurality of individual video frames corresponding to the portion of the video based on the received specification of the edit; and displaying the first individual video frame of the plurality of individual video frames before applying the edit to a second individual video frame of the plurality of individual video frames corresponding to the portion of the video based on the received specification of the edit;

providing input data to a machine learning model, wherein the machine learning model is used to make a determination of applying the edit to the portion of the video on the client or a server of a cloud service;

in response to the determination of applying the edit to the portion of the video on the server of the cloud service, providing to the server of the cloud service at least the specification of the edit to the portion of the video and the portion of the video without the edit applied;

generating, based at least in part on the determination, an edited video comprising the portion with the edit;

in response to the determination of applying the edit to the portion of the video on the client, applying the edit to the portion of the video on the client and providing to the server of the cloud service the portion of the video with the edit applied; and in response to providing to the server the portion of the video with the edit applied, causing the video to be deleted.

16. The computer program product of claim 15, wherein providing on the client the preview of the video with the edit applied to the portion of the video prior to encoding the video further comprises:

applying the edit to a plurality of individual video frames corresponding to the portion of the video based on the received specification of the edit; and displaying the plurality of individual video frames on the client.

* * * * *